United States Patent [19]

Scardino et al.

[11] Patent Number: 5,506,880
[45] Date of Patent: Apr. 9, 1996

[54] X-RAY INSPECTION SYSTEM AND METHOD

[75] Inventors: Paul G. Scardino, Layton; Ringo C. Beaumont, Bear River, both of Utah

[73] Assignee: Morton International, Inc., Chicago, Ill.

[21] Appl. No.: 357,716

[22] Filed: Dec. 16, 1994

[51] Int. Cl.$^6$ .................................................. H05G 1/64
[52] U.S. Cl. ........................ 378/98.2; 378/62; 378/207; 364/413.13
[58] Field of Search ........................ 378/98, 98.2, 98.3, 378/62, 99, 18, 207; 364/413.13, 413.23

[56] References Cited

U.S. PATENT DOCUMENTS

| 4,789,930 | 12/1988 | Sones et al. | 364/413.13 |
| 5,123,037 | 6/1992 | Picard et al. | 378/99 |
| 5,434,902 | 7/1995 | Bruijns | 378/98.7 |

Primary Examiner—David P. Porta
Assistant Examiner—David Vernon Bruce
Attorney, Agent, or Firm—Leydig, Voit & Mayer, Ltd.

[57] ABSTRACT

An x-ray system and method capable of producing very accurate RTR images corrected for x-ray system inhomogeneities. A three-dimensional correction memory is used to store deviation information relating to system inhomogeneities. The three-dimensional correction memory is indexed by x and y coordinates of the image plane and an attenuation coordinate associated with a plurality of standard samples. The standard samples are exposed in turn, and deviations between the measured attenuation and the nominal attenuation are noted and stored at the x and y coordinates in the attenuation plane for the sample then exposed. The procedure is repeated for a plurality of samples to create a three-dimensional correction array. An object to be imaged creates a set of raw intensity information. The raw information is corrected by accessing the correction memory at the x and y coordinates of each pixel to be corrected and the attenuation coordinate associated with the raw measurement. The deviation information is applied to the raw measurement to produce and store a corrected attenuation factor for each pixel.

18 Claims, 5 Drawing Sheets

X-RAY INSPECTION SYSTEM AND METHOD

FIELD OF THE INVENTION

This invention relates to x-ray inspection systems and methods, and more particularly to those which utilize a planar or quasi-planar detector associated with a system for producing pixelized digital x-ray attenuation information.

BACKGROUND OF THE INVENTION

At the outset, it will be noted that the phrase "x-ray attenuation information" is used in its broad sense as relating to numerical values characterizing the x-ray attenuation characteristics of a given material. The linear attenuation coefficient is only one example. Other standardized measures, such as density, can be used, and it is also possible to use an arbitrary scale suited to the particular application.

Inspection systems of the type to which the present invention is directed are intended to produce high accuracy attenuation information on a pixel-by-pixel basis for an object being examined. The information can be displayed as an image or alternatively can be processed in a data processor. For example, a processor may be programmed to examine a pixelized set of attenuation data to locate faults in the object which had created the data set. High accuracy is needed in such systems. In one such example, a system is capable of producing 256 gradations in attenuation coefficient, and the preferable accuracy required is an accuracy within two units of the true attenuation.

In a typical x-ray system, such accuracy is not readily available. First of all, the x-ray beam itself typically has hot spots, and the location of the hot spots can change over time, particularly if the tube is switched on and off. A typical sensor for such a system is the image intensifier, and like the x-ray tube, the image intensifier will have localized areas which are more efficient than others, also creating the effect of "hot spots". Misalignment of the beam with respect to the image intensifier can further add to the inaccuracies. Indeed, even the geometry of the system in which the ray length is not constant causes an inherent inaccuracy; the image intensifier has a convex surface normal to the beam and therefore requires a ray length (from the x-ray source focal spot to the image intensifier) which increases with increasing distance from the center of the image intensifier.

A technique called "image subtraction" can conceptually be utilized to correct for some of these errors. In image subtraction, a reference image intended to include as many of the system errors and inaccuracies as possible, can be subtracted from an image to be processed, with the subtraction intending to remove the inaccuracies, leaving simply the image relating to the sample. Image subtraction to remove errors such as those described above presents a number of difficulties, and is not believed adequate to accomplish the necessary correction.

SUMMARY OF THE INVENTION

In view of the foregoing, it is a general aim of the present invention to produce real time radiographic images (RTR images) of unknown samples which are corrected for errors attributable to the x-ray system, so as to produce attenuation information which is more accurate than has been available heretofore.

In accomplishing that aim, it is an object to obtain correction data for the x-ray system which is truly representative of the measurements which the system will make in operation. An objective is then to use the representative correction information in rendering the RTR images more accurate than has been possible in the past.

A further object, in accordance with the present invention, is to provide an x-ray inspection system which is carefully calibrated to produce correction information representative of a range of conditions in which the system is to function, and to select the information appropriate to a particular measurement to make the best possible correction.

A specific object of the present invention is to operate directly on the image attenuation information, to render the images more accurate than has been possible in the past. That is in contrast to operating on the image using processing techniques such as image subtraction. A resulting object is to produce RTR images, that is, data sets of attenuation coefficients, which are more accurate than can be produced using physically realizable x-ray systems.

It is a feature of the invention that a three-dimensional correction memory is provided which is indexed by the x and y coordinates of the image space and an attenuation coordinate relating to the range of attenuations to be inspected. When a raw attenuation measurement is made, the correction memory is addressed at the x and y coordinates of the pixel in question and at approximately the attenuation coordinate of the raw measurement. A correction factor is obtained and applied to the raw measurement to obtain a corrected measurement which is corrected for the x-ray inhomogeneities of the system which have been determined in measurements representative of the sample measurement just made.

Other objects and advantages will become apparent with reference to the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figures 1, 2:
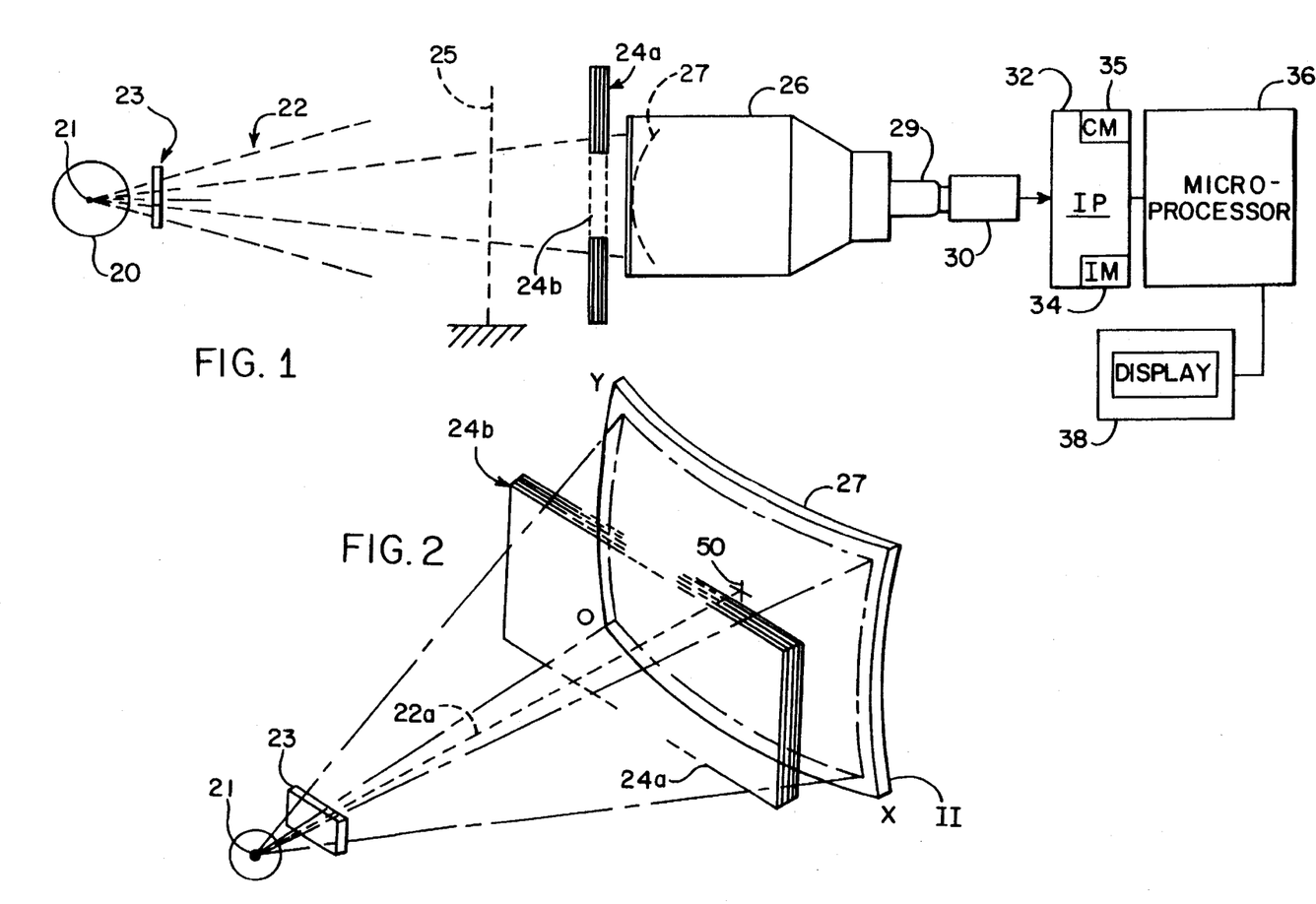
FIG. 1 is a diagram illustrating the geometry of an x-ray system for practice of the present invention.
FIG. 2 is a perspective diagram illustrating the geometric relationship between the x-ray source and detector in the system of FIG. 1.

Turning now to the drawings, FIG. 1 schematically illustrates the geometry of an x-ray system for practice of the present invention. An x-ray source 20 has a focal spot 21 from which is emitted a sector shaped swath 22 of radiation. The sector shaped swath 22 is in the nature of a fan beam which has diverging width, and serves to illuminate a two-dimensional image plane 25. The image plane 25 is the location in which an object to be inspected is to be positioned. The shape of the swath 22 is controlled by a diaphragm type collimator schematically illustrated at 23, which is associated with the x-ray source 20. An image side set of biaxial collimator plates 24a, 24b provide control over the x-ray switch 22 as it impinges on the x-ray sensing elements.

The system includes an x-ray detector 26 preferably of the type using an image intensifier screen 27. The image intensifier screen 27 provides a quasi-planar surface for receiving x-radiation from the source which penetrates the sample in the image plane 25 and in response thereto emits visible radiation. The visible radiation is focused and detected by an optical sensor such as CCD camera 30 interfaced to the image intensifier 26 by coupling optics 29. The CCD camera 30 has an electrical output signal which represents a two-dimensional image of the sample in the image plane 25 which had been illuminated by the x-rays 22 and sensed by the image intensifier 26. The signals are passed by the CCD camera 30 to an image processor 32. The image processor, as will be described in greater detail below, contains an image memory 34 which stores a digital RTR image. In accordance with the invention, the image processor 32 also has a correction memory 35 which is utilized to correct the RTR image stored in the image memory 34. A microprocessor 36 is connected to the image processor for controlling the sequence of operations. Alternatively, the processor which is conventionally used within the image processor 32 can operate independently without external control from the microprocessor 36. The digital RTR image stored in image memory 34 can be displayed on a display 38. Alternatively, the microprocessor 36 can process the attenuation information stored in the image memory 34 to produce an output indicating the presence or absence of faults in the sample which had been examined.

As noted previously, the x-ray source 20 is not capable of producing an x-ray field which is completely uniform. The x-ray field will thus contain hot spots whose position and intensity is random. However, for so long as the x-ray source 20 remains energized, the characteristics of the hot spots will remain about the same. Thus, in practicing the present invention, we prefer to use a continuously-on x-ray source, to produce correction information relating to that source in its "on" condition, and to continue to use that information throughout a sequence of measurements which are made while the source remains on. To that end, samples which are presented to the system for measurement can be conveyed into a shielded x-ray chamber through specially designed entrance and exits which include labyrinth seals and the like to prevent the escape of x-radiation and preferentially absorb secondary radiation. Such systems are conventional, and form no part of the present invention and are thus not illustrated in the drawings.

In addition to the x-ray hot spots, it will be noted that the geometry of the system itself, in which the x-ray beam 22 is in the nature of a fan emanating from a point source, but the active x-ray detector surface 27 is convex in shape, also introduces inaccuracies. Thus, it will be seen that a central beam 22a in the x-ray swath 22 will intersect the image intensifier screen 27 at about its center, and will be the shortest path for any x-ray in the system. Any other x-ray path from the focal spot 21 to the image intensifier screen 27 will be longer than the central ray 22a, and thus will inherently have lesser intensity by the time it reaches the image intensifier. The decrease in intensity is a function of the square of the ray length, and is thus not insignificant. In accordance with the invention, not only can random variations such as the hot spots be accommodated for, but also systematic variations such as those resulting from the system geometry.

In addition to the hot spots in the x-ray field itself, practical image intensifiers cannot achieve a completely uniform response characteristic. It would be preferable for incident x-rays of a given total energy to produce an output optical intensity at the pixel in question of a given intensity, no matter where on the image intensifier screen those x-rays are received. However, that is not the case, and the sensitivity of the image intensifier also varies randomly.

Figure 6A:
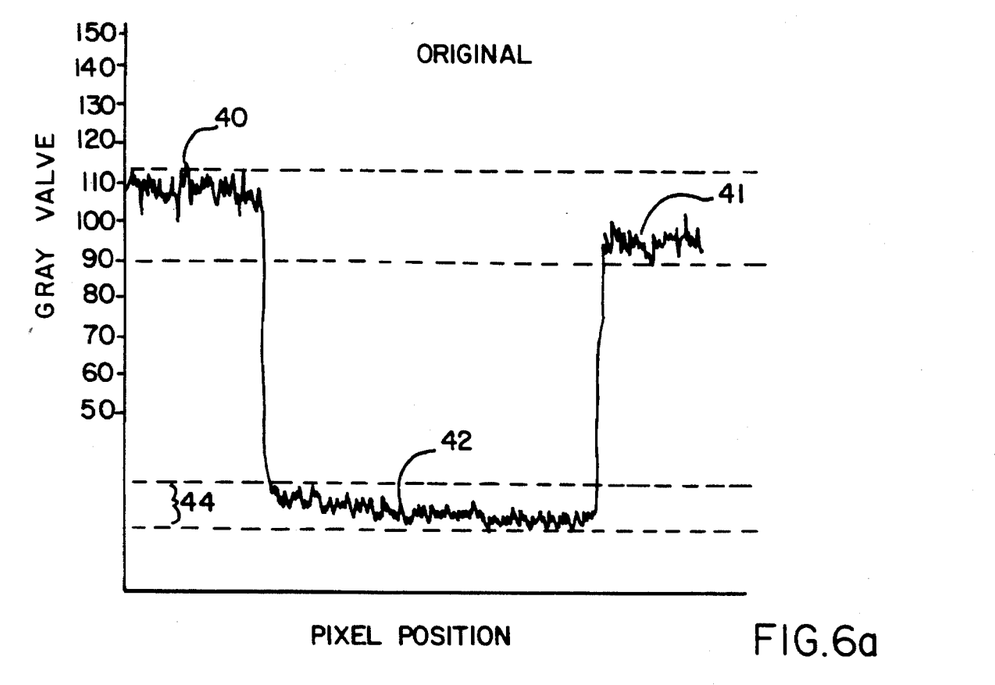
FIGS. 6a and 6b are graphical representations of the response of a system constructed in accordance with FIG. 1 prior to and after correction in accordance with the present invention.

In an exemplary system constructed in accordance with the present invention, the output attenuation readings from minimum to maximum attenuation are correlated from 0 to 255 in computer imaging gray scale. It is very desirable in high quality systems to be able to maintain an accuracy of within 2 units on such a scale. The random variations and systematic variations which have been described heretofore, in all practical systems, would prevent that. Referring briefly to FIG. 6a, there is shown the response characteristics of an x-ray system for one line scan across the image intensifier. It is seen that the horizontal axis is pixel position and the vertical axis is gray scale readings. The image is that of a step wedge in which the high gray scale values at the shoulders 40, 41 of the U-shaped curve are intended to be substantially no attenuation, and the series of readings 42 at the trough of the U are intended to be the high attenuation representative of the x-ray attenuation of the wedge. The output readings for the shoulders 40 and 41 are intended to be equal to each other, and it will be apparent from FIG. 6a that the system is not capable of measuring them as equal. Also, it will be seen that a reasonably substantial band 44 characterizes the deviation between the minimum and maximum readings for the step wedge itself, readings which, if the system were perfect, would all be approximately equal to each other.

It will be appreciated from FIG. 6a that while it is possible to obtain some information from an uncorrected RTR image, the system inaccuracies are such that it is difficult to place much confidence in even significant deviations from one reading to another, which in the example of FIG. 6a, should be substantially the same. The difficulties in using an x-ray system such as FIG. 1 with uncorrected readings, for making highly precise judgments of differences in attenuation coefficients which are only marginally different from each other will thus be apparent.

The optimized practice of the invention involves two aspects, one being the accurate alignment of the x-ray system itself, and the second being the creation and use, with an aligned system, of a three-dimensional correction memory which includes correction information not only for the x and y coordinates of the image space, but also includes a third dimension relating to the range of attenuation coefficients which are intended to be inspected. The application of the appropriate correction factor, in dependence on the raw intensity readings actually measured, for correction of the raw readings, will then produce an RTR image which is much more accurate than has been achieved heretofore.

With respect to the alignment aspects of the invention, reference is made to FIG. 2. The image intensifier 26 is shown in perspective so as to illustrate the x and y coordinate system associated with the image intensifier (and therefore also with the image plane 25). The focal spot 21 of the x-ray source is shown as the point from which the x-ray swath 22 emanates. A collimating diaphragm 23 at the source side of the x-ray beam attenuates approximately 30% of the outer periphery of the beam, narrowing the bandwidth of the same. The bandwidth is the ratio of the primary beam frequencies, referred to as the beam heel, over the central frequency of the beam. In addition to the source side collimator 23, a pair of collimator plates 24a limit the height of the x-ray beam and a further pair of collimator plates 24b control the width of the x-ray beam at the imaging side. The image intensifier has a central region of peak illuminance 50 and that is utilized to align the x-ray source with the x-ray sensor. In the case of the image intensifier, the illuminating conversion screen and photoconductor screen (schematically shown at 27) have conversion efficiency characteristics and optical curvature requirements which deliver an overall distortion and uneven illuminance to the image.

Figure 3:
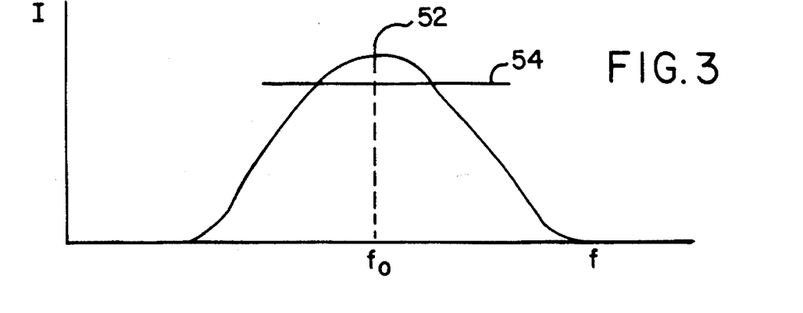
FIG. 3 is a diagram showing the spectral energy content of a typical x-ray source.

It is well known that the x-ray source produces an energy distribution which is Gaussian-like in shape. The lower intensities are filtered out, as by aluminum filtration, but the remainder of the x radiation, which is projected in the swath 22 assumes a Gaussian distribution much like that shown in FIG. 3. It is seen that the energy level (and therefore the frequency) of the x-ray source is illustrated along the horizontal axis, and the vertical axis plots relative intensity. The peak 52 of the x-ray energy distribution curve, that is, the point in the x-ray distribution at which the intensity is highest, is designated $f_0$. That will be characterized as the peak frequency of the x-ray distribution. In aligning the system of FIG. 2, it is desirable to cause the part of the beam which interacts with the image intensifier to be at an energy level within 90% of the peak 52. (The 90% limit is denoted by the line 54 in FIG. 3.) In addition, it is of great benefit to align the x-ray source and detector such that the center frequency of the beam (i.e., the ray near the center of the beam which has the highest intensity) to be incident on the central peak illuminance region 50 of the image intensifier. When aligning the most intense part of the beam with the center of the image intensifier, the natural tendency of the beam intensity to decrease in all directions from its most intense point, coupled with the fact that the decreasing intensity will also be associated with rays of increasing length, will cause the x-ray system to operate in a predictable manner. In order to achieve alignment of the center frequency with the central peak illuminance region 50, the image processor is activated to take a reading with the x-ray source energized, and to examine the reading to determine the pixel or pixels which are receiving the highest x-ray intensity. Relative motion between the x-ray source and image intensifier, preferably by a motorized alignment device for the image intensifier, is utilized to bring the center frequency to the central peak illuminance region 50.

Following the alignment of the center, the collimators 24a, 24b are adjusted to limit the beam so that it does not project beyond the image intensifier, and also to assure that the energy falling anywhere on the image intensifier is within 90% of the energy level at the center peak illuminance region 50. To affect that adjustment, the collimators are also motorized.

Following this alignment of the x-ray geometry, the x-ray technique parameters are adjusted, (kVp and ma), to achieve the contrast discrimination, sensitivity and resolution needed for the specified objects to be inspected. Because of the accuracy expected of the system, it will be appreciated that it is important to match the system to the characteristics of the material being examined, and different types of material will require not only different settings of the x-ray system, but also different calibration samples for setting the three-dimensional correction table.

Having thus aligned the geometry and set the x-ray source for the types of material to be inspected, the second aspect of producing highly accurate readings includes the creation of a three-dimensional correction table which is later employed in correcting individual RTR images. It will be recalled that the correction memory is illustrated at 35 in FIG. 1, and comprises a memory section either in or associated with the image processor 32.

We have found that it is important in setting up the correction table to utilize samples of the same material as the object to be inspected. Samples are utilized which vary across the expected range of gray scale outputs. For example, 10 samples may be utilized to span a gray scale range of 256 shades, with the samples being spaced at approximately 25 units from each other. Preferably, the units are of varying thickness to achieve the varying attenuation factors needed. Use of the same material with thickness varied for attenuation, serves to reduce inaccuracies caused by refraction problems which might result from use of different materials or different densities.

Figure 4:
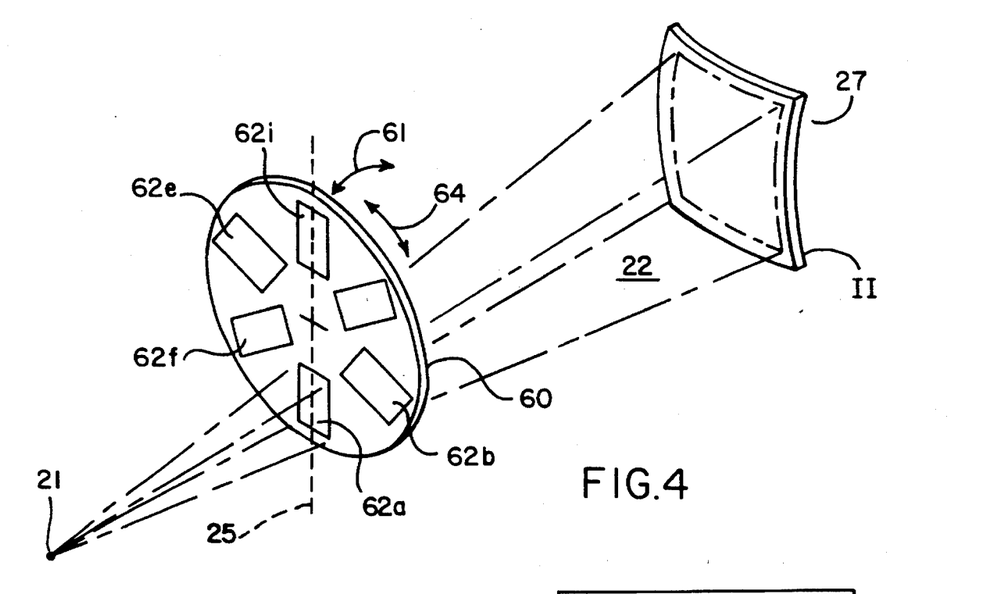
FIG. 4 is a diagram illustrating the sequential positioning of a plurality of calibration samples into the image plane of the system of FIG. 1.

Keeping in mind that it is preferred to utilize a continuously-on x-ray source, rather than pulse the source on and off between adjustments to calibration samples, it will be useful to provide an automatic means for sequentially presenting calibration samples to the x-ray system. Such means are schematically illustrated in FIG. 4. FIG. 4 again shows the x-ray source by indication at of the focal spot 21 and also illustrates by dashed line 25 the position of the image plane. The image intensifier screen is shown at 27. Superimposed on the image plane is a multiple calibration sample carrier 60. As illustrated by the arrow 61, the carrier can be pivoted into position in the image plane 25 so that one of the samples occupies the image plane in the path of the x-ray beam 22. In the alternative position, the calibration sample carrier is completely removed from the x-ray beam, and the image plane 25 is free to receive samples to be imaged.

It will be seen that the carrier 60 is configured as a wheel and carries a plurality of calibration samples 62a–62f. It was noted above that preferably 10 samples will be utilized, but the illustration of FIG. 4 will be adequate to represent the overall requirements. In addition to being pivotable along the line 61 for moving the calibration carrier 60 into position, the calibration carrier 60 is also rotatable about its center as exemplified by the double headed arrow 64. In the illustrated position, a first calibration sample 62a intercepts the x-ray beam 22, such that the image intensifier produces an output luminance which is representative of the attenuation of the sample 62a. The sample 62a is of closely controlled uniform x-ray attenuation, and has a known attenuation factor, such as 25 gray scale units, associated therewith. The image processor 32 is operated to take a full set of readings (for all x and y coordinates of the image intensifier screen 27), and to store information related to that two-dimensional set of readings in the correction memory 35. Rather than storing the readings directly, it is preferred to store deviations between the measured gray scale level and the known gray scale level of the calibration sample attenuator. It is also preferable to arrange the system such that the center peak illuminance region 50 (FIG. 2) measures a signal which matches the gray scale value of the calibration sample. Thus, the central peak illuminance region will have a deviation of zero units. Those pixels which are associated with either hot spots in the x-ray source or sensitive areas of the image intensifier will produce lower attenuation readings, and those which have the opposite character will produce higher attenuation readings. The deviation between the measured gray scale value and the known value of the calibration sample is determined (such as +3 units or −4 units), and that information is stored in a plane of the correction memory array associated with the calibration sample 62a.

Figure 5:
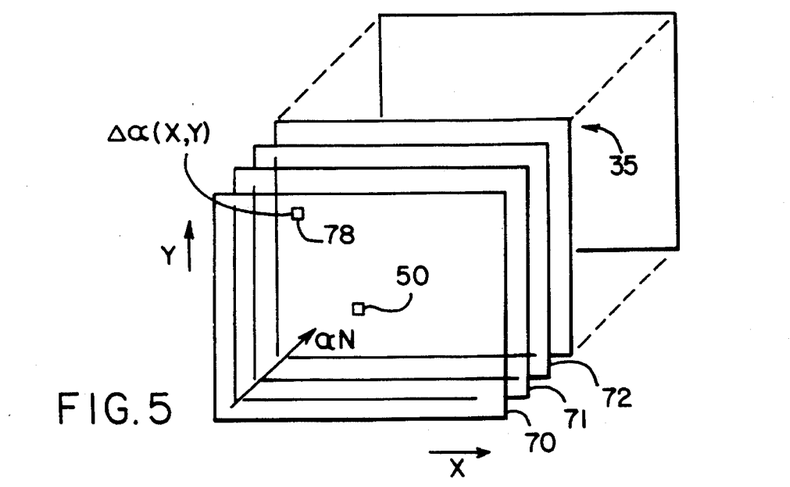
FIG. 5 is a graphical representation of a three-dimensional correction memory constructed in accordance with the present invention.

Turning briefly to FIG. 5, there is schematically illustrated the structure of the correction memory. It will be seen that the memory includes a plurality of planes 70, 71, 72, etc. Each plane, such as the plane 70, represents a set of x and y coordinates, comprising all of the pixels for a given view. The plane 70, for example, is associated with the calibration sample 62a (FIG. 4). Thus, all of the deviations in measured intensity through the calibration sample 62a for each of the pixels are stored in the associated pixel of the plane 70 of the correction memory 35. It will be seen that a sample pixel 78 is shown and carries the notation $\Delta\alpha(x, y)$, indicating that the information stored in that location of the memory represents the deviation of the attenuation measured by the system as compared to the standard deviation of the sample being imaged for the plane 70. When deviations for all x and y coordinates of the sample 62a are recorded in the plane 70 of image memory 35, the next calibration sample 62b is rotated into position. The sample 62b may, for example, have a standard attenuation value of 50 gray scale units associated therewith. The image processor 32 is activated to take a set of readings through the sample 62b, and to determine deviations as was done in connection with sample 62a. As with the sample 62a, it is preferred that the center peak illuminance region 50 of the image intensifier be associated with a zero deviation, and that all of the other pixels, to the extent the readings differ from the standard calibration, have the deviations computed and stored in the correction memory 35. In the illustrated embodiment, the deviations for the sample 62b are stored in a second plane 71 of the correction memory 35. The procedure is repeated for each sample, and a new plane of the correction memory 35 is filled with deviation information until readings for all of the calibration samples, and deviations are recorded. At that point, as will be appreciated by an examination of FIG. 5, the correction memory 35 represents a three-dimensional correction array in which two of the dimensions are the x and y coordinates of the image intensifier (or the image plane), and the third coordinate relates to attenuation, in this case, the standard attenuation values for the calibration samples. That information is stored in association with the image processor as suggested in FIG. 1, and is then available for use in correcting the image.

Figure 7:
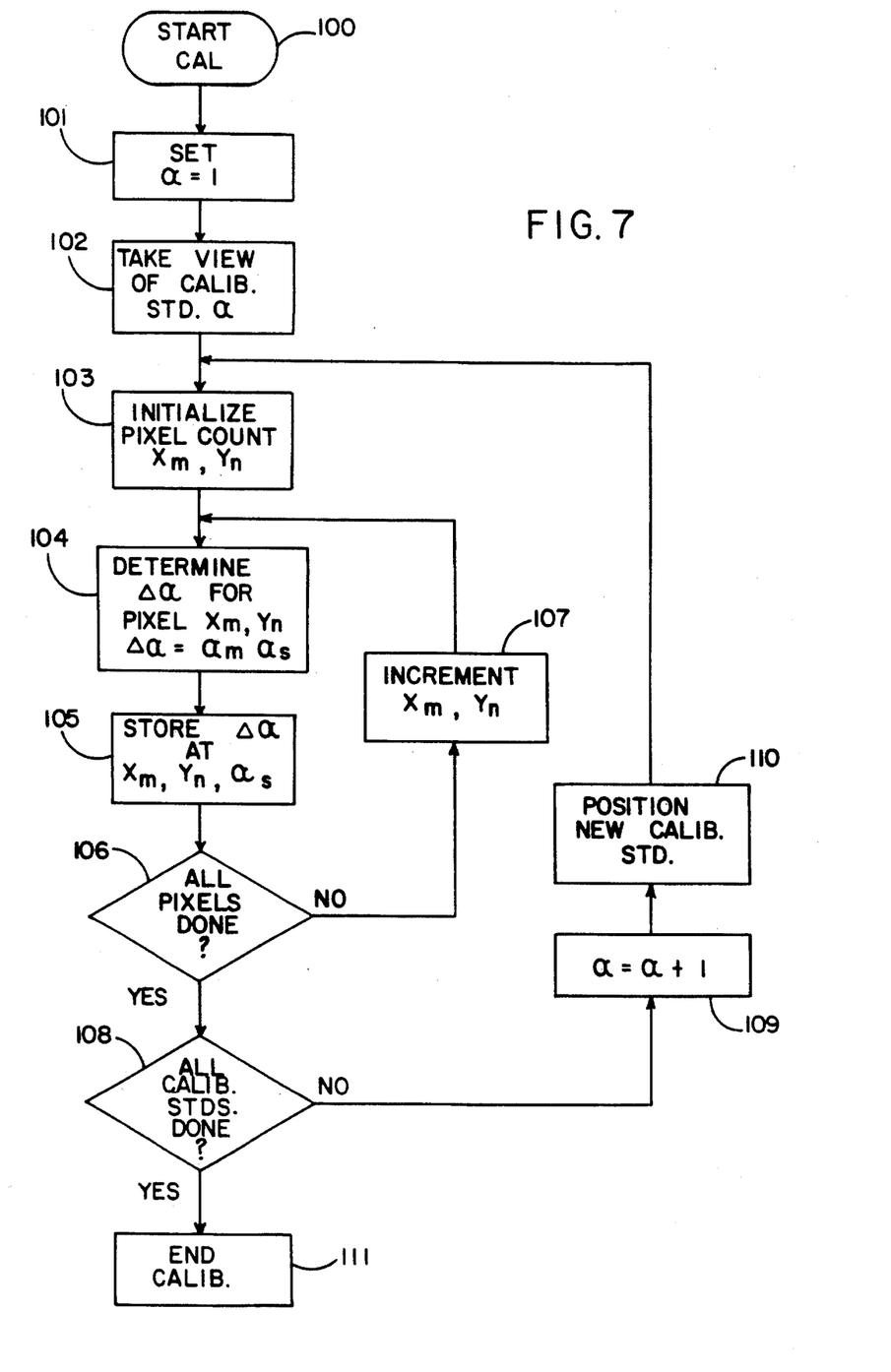
FIG. 7 is a flowchart illustrating a procedure for configuring a three-dimensional correction memory in accordance with the present invention.

FIG. 7 illustrates generally the calibration procedure which commences at a start calibration step 100. A first index is set to unity at a step 101 following which the image processor 32 is operated to take a full set of readings (for all pixels) in a step 102. Those readings can be temporarily stored, or alternatively, as the readings are taken on the fly, the process of determining deviations can be accomplished without storage. The flowchart of FIG. 7 illustrates the latter technique. In a step 103, the first pixel of the image space for the first calibration sample is established. For that pixel, a step 104 is executed to determine the deviation for that pixel. It will be seen that the deviation is defined by the expression:

$$\Delta\alpha = \alpha_m - \alpha_s$$

where $\Delta\alpha$ is the deviation, $\alpha_m$ is the measured $\alpha$ for the pixel, and $\alpha_s$ is the standard $\alpha$ associated with the calibration standard. A step 105 is performed to store the $\Delta\alpha$ in the correction memory at the location associated with the pixel $(x_1, Y_1)$.

A test 106 then determines that all pixels have not been processed, following which a step 107 increments the pixel. The steps 104, 105 are again performed on the new pixel. When all of the pixels are processed, a further test 108 is performed to determine if all of the calibration standards have been processed. When they are not, a step 109 is performed to increment the index of the calibration standard (and also to increment the plane of the correction memory in which the $\Delta$ information will be stored). The new calibration standard is positioned in step 110, and the process repeated. When all of the calibration samples have had deviations determined therefor, the process is at an end, as indicated by step 111.

In practicing the invention, the information in the correction memory which is produced according to the steps described in connection with FIG. 7, is utilized to correct raw image data to produce more accurate image data. It is noted that it is the RTR images, that is, the actual raw data from the image processor, which is being corrected, rather than digitized image data itself. Algorithms are available in image processing for performing various operations on the image, and those often rely on context, image subtraction, and the like. In accordance with the present invention, it is the unprocessed image itself which is corrected, and that achieves an enhanced and more accurate gray scale level for the imaged sample which is corrected for the now-known inhomogeneities in the x-ray system, and indeed for the inhomogeneities at the levels at which the measurement is actually taken.

Figure 8:
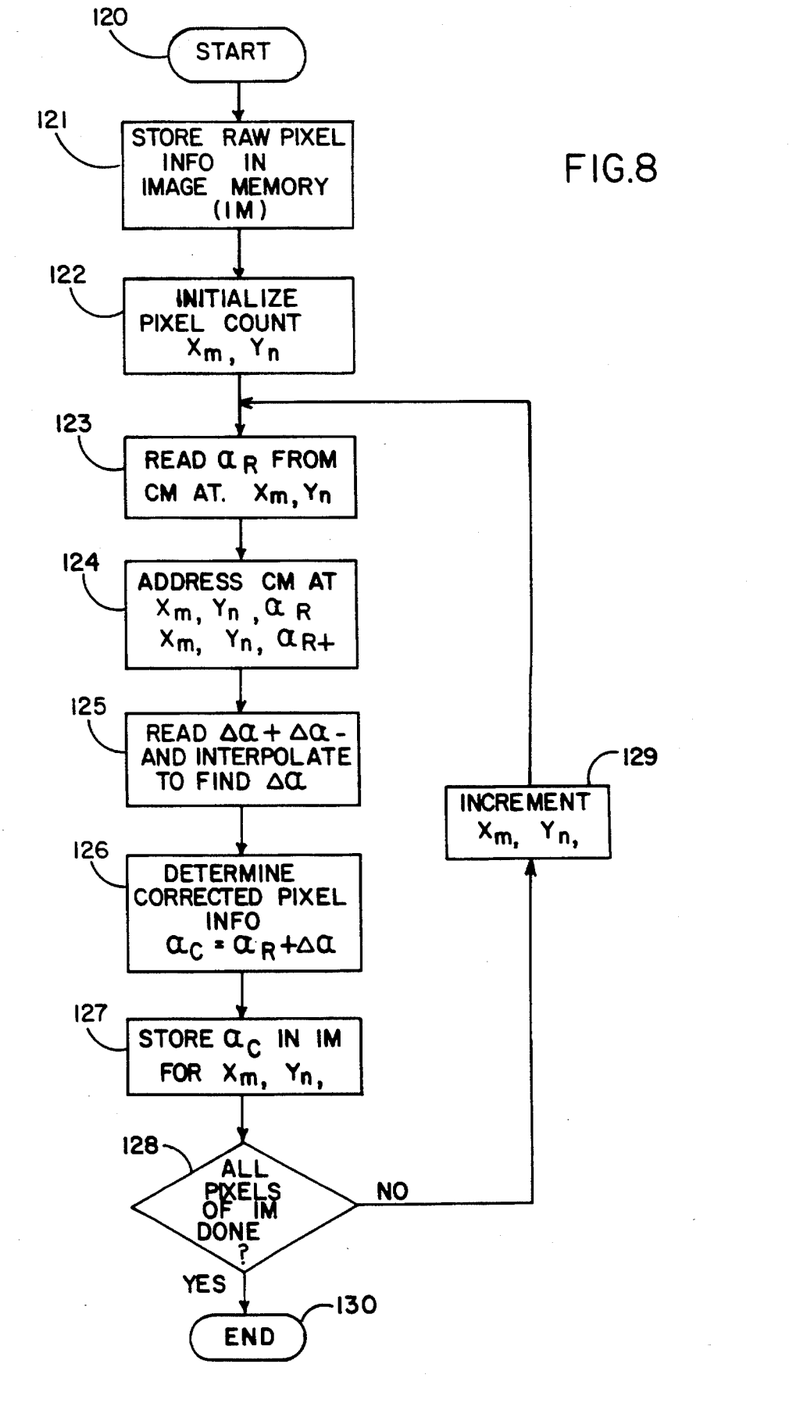
FIG. 8 is a flowchart illustrating a procedure for making and correcting an RTR image in the practice of the present invention.

To that end, a procedure is illustrated in FIG. 8 which applies the three-dimensional correction memory to raw data taken by the image processor in order to achieve such corrected results. It will be seen that the procedure starts with a step 120 and first of all performs a step 121 which stores a set of raw pixel information in the image memory 34 of FIG. 1. A step 122 is performed to initialize the pixel count, and for the first pixel the attenuation information from the image memory for that pixel is read out in step 123. The designator for that information is shown in FIG. 8 as being $\alpha_r$.

In practicing the invention, a step 124 then addresses the correction memory at locations related to the pixel being processed and also to the raw attenuation information which had been measured for the uncorrected image. The step 124 addresses the correction memory at two locations $(x_m, Y_n, \alpha_{R-})$, and $(x_m, Y_n, \alpha_{R+})$. The subscripts on the x and y coordinates are intended to represent the pixel which is being processed. The designators $\alpha_{R-}$ and $\alpha_{R+}$ are intended to suggest that the planes of the image memory (for the pixel in question) are read for the calibration samples which are just above and just below the raw reading which had been measured at the step 121.

A step 125 is then performed to determine a correction value for the actual reading. It is preferred to determine that value by linear interpolation between the deviations stored in the three-dimensional memory for the samples which bound the actual measurement, i.e., those on either side of the raw data. Thus, the result of step 125 is the provision of a correction factor for the pixel in question which is linearly interpolated between the two closest calibration standards to the actual raw data reading. A step 127 is then performed to determine a corrected attenuation reading, which is the sum of the raw reading and the deviation determined in step 125. The result of step 126 is then stored in the image memory in the step 127 for the pixel in question. A test 128 determines that not all pixels have been processed, and a step 129 thereafter increments the pixel (either x or y) and the process repeated. It will be appreciated that for nonuniform material, different planes of the three-dimensional correction memory will be addressed, as the system increments through the x and y coordinates, with the different planes of the image memory serving to provide a correction which is closely associated with the actual raw data measurement which was taken by the system for the sample in question. The result is the provision of much more accurate gray scale information than has been achievable heretofore.

We have found that it reduces the computational load without significantly degrading the accuracy if the deviation values in the correction memory are grouped into super pixels, and common deviations applied to each subpixel of the image memory which goes to make up a super pixel. For example, the image memory may consist of an image of 640×480 pixels. In order to speed up the processing and reduce memory requirements, it is possible, and often preferable, to configure the correction memory with fewer pixels, grouping the pixels of the image memory into 5×5 super pixel groupings for the correction memory. Thus, whenever a first subpixel in a super pixel is to be processed, a correction factor for that pixel is determined and applied to the raw data reading. If the next pixel is in the same attenuation range, which it is likely to be, the same correction will also be applied to the second pixel of the image memory. If, however, a subpixel within a super pixel grouping has a raw attenuation reading which is associated with a different plane of the correction memory, a different correction value will be determined for that subpixel. However, assuming that the subpixels within a super pixel are all at about the same attenuation level, which they will be for most practical materials, then the readout and linear interpolation step 124, 125 of FIG. 8, need be performed only once per super pixel, with the same correction applied in step 126 to all of the image subpixels which make up that super pixel. However, particularly when using very fast processors with math co-processors, and in systems where adequate memory is available, the system can be operated with the pixel size in the correction memory and the pixel size in the image memory being identical to each other, and different correction values determined for each image memory pixel.

The preferred embodiment of the invention has been described above which addresses two planes of the correction memory (the plane above and the plane below the raw data reading), and applies linear interpolation to the deviation information at those two locations. The general description has been characterized in terms of addressing the three-dimensional correction memory at the x and y coordinates of the pixel and the attenuation coefficient coordinate of the raw reading. That general characterization is intended to encompass the preferred two plane addressing with liner interpolation, as well as other equivalents. In some cases, it will be desirable to address more than two planes, and in some cases, it may be adequate to address only a single plane, particularly where the raw reading is very close to the attenuation index of one of the planes. Thus, the general characterization is intended to be broader than the preferred linear interpolation embodiment, but to encompass that embodiment.

Figure 6B:
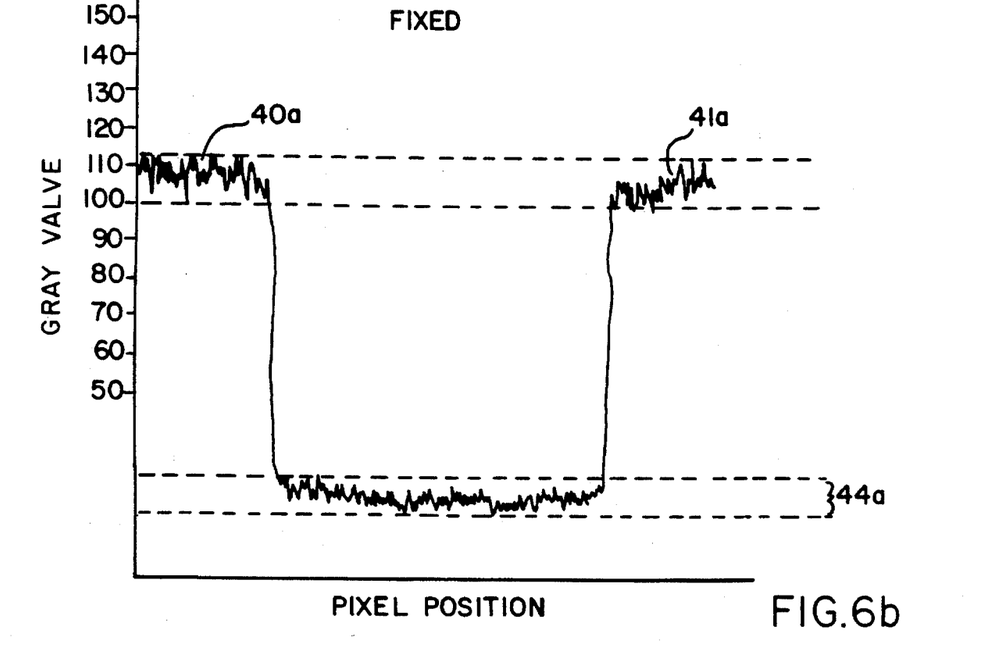

Referring again to FIG. 6a, it will be recalled that the figure illustrates the uncorrected or raw gray scale readings for a single line of an image taken of a step wedge. The substantial deviation 44 for the gray scale level of the wedge, and also the significant difference in gray scale levels between what should be identical shoulders 40 and 41, will be apparent. FIG. 6b illustrates the result of an early experiment utilizing correction values applied in accordance with the invention and as described in connection with FIG. 8. It will be seen that the corrected shoulders 40a, 41a are much nearer to identical values, and the deviations 44a in readings of the gray scale are also reduced. Except for information resulting from random electrical noise, the corrected values illustrated by FIG. 6b represent a marked improvement over the raw values of FIG. 6a. While the values at the shoulders 40a, 41a vary by about ±5 units, the values for the step wedge itself (the range 44a ) is only about ±3 units, an accuracy much greater than has been achievable heretofore. Even more important than the pixel-to-pixel accuracy (or variation) is the confidence level which can be attached to gray scale values determined in accordance with the present invention. Particularly when taken in the context of an overall image, the high frequency pixel-to-pixel variation will be recognized as high frequency noise, while variations of a similar magnitude would occupy a relatively large number of pixels, will be recognized as a variation in the attenuation coefficient of the material. Thus, when utilizing the invention, those skilled in the art will be able to confidently rely on small attenuation differences as resulting from actual attenuation differences in the material, and not from inhomogeneities in the x-ray source or imaging subsystems.

It will be appreciated that there are instances where x-ray inspection of materials has been potentially useful (where the items were compatible with x-rays without damage, and x-rays would tend to show the fault being searched for), but where it was not used because the difference in gray scale level between the fault and the unfaulted material was so slight (say a few gray scale units) as to be masked by the inhomogeneities of the x-ray system. Thus, it was not possible to use a relatively simple x-ray examination technique in the manufacturing line which produced the items in question. However, in accordance with the practice of the present invention, the inhomogeneities can be reduced to the extent that even very small differences in x-ray attenuation characteristic can be reliably detected, removing the uncertainty which had heretofore been associated with the characteristics of the x-ray system itself. Thus, when a system such as FIG. 1 is operated in accordance with the invention, and a very small anomaly in attenuation coefficient is determined, the operator can be certain that the anomaly results from the structure of the sample being imaged, and not the faults of the x-ray system.

It will also be appreciated that since the calibration procedure can be operated automatically and relatively quickly, and since the calibration samples can be automatically brought into position and indexed, recalibration can be done periodically to assure the system is operating near peak accuracy. Certainly, whenever the x-ray source is shut down, a recalibration should be performed, since turning the x-ray source back on will very likely create hot spots in different positions. But in addition to running a calibration whenever the system is first powered up, it is also possible using the techniques taught here and to recalibrate the system say hourly or twice a day to provide a highly reliable inspection system in-line on a production line and capable of identifying samples whose defects are manifest by only a very small difference in x-ray attenuation.

What is claimed is:

1. A method of producing digital images corrected for x-ray system inhomogeneities, the digital images being representative of the x-ray attenuation of objects to be inspected, the method comprising the steps of:

(a) calibrating for x-ray system inhomogeneities by:
  (i) positioning a calibration sample of substantially uniform attenuation coefficient at the image plane;
  (ii) operating the detector measure a field of attenuation information for the calibration sample;
  (iii) producing a two-dimensional array of attenuation information for the sample wherein the two dimensions are the x and y coordinates of the image plane, and the information stored for each coordinate relates to any deviation between the measured attenuation coefficient and the uniform attenuation coefficient of the sample;
  (iv) performing the steps (ii) and (iii) for a plurality of calibration samples to produce a three-dimensional correction array in which the coordinates are the x and y coordinates of the image plane and the uniform attenuation coefficients of the calibration samples;

(b) positioning an object to be inspected in the image plane and exposing it to x-rays to collect a raw set of attenuation coefficients for the object;

(c) correcting the raw set of attenuation coefficients on a pixel-by-pixel basis by:
  (i) obtaining for each pixel a correction value by addressing the three-dimensional correction array at the x and y coordinates of the pixel and the attenuation coefficient coordinate of the raw coefficient to derive a correction factor; and
  (ii) applying the correction factor to the raw attenuation coefficient to produce and store a corrected attenuation coefficient.

2. The method as set forth in claim 1 wherein the step of addressing the three-dimensional correction array addresses the array at two planes defined by the uniform attenuation coefficients which bracket the raw attenuation coefficient for the pixel, and further performing the step of interpolating between the correction factors derived from the two planes.

3. The method as set forth in claim 2 wherein the three-dimensional array is configured to store samples for super pixels comprising a subarray of pixels from the image plane, the correction factor for the super pixel being applied to all of the image plane pixels comprising the super pixel.

4. A method of producing digital images corrected for x-ray system inhomogeneities, the digital images being representative of the x-ray attenuation of objects to be inspected, the method comprising the steps of:

(a) adjusting the relative positions of an x-ray source and a planar x-ray detector with respect to an image plane such that the center of the x-ray source is centered on the detector and passes through approximately the center of the image plane;

(b) collimating and adjusting the x-ray beam such that the energy level of all x-ray energy falling on the sensor in the absence of an object in the image plane is within 10% of the energy at the center of the x-ray source;

(c) adjusting the parameters of the x-ray source to suit the requirements of the objects to be inspected;

(d) calibrating for x-ray system inhomogeneities by:
  (i) positioning a calibration sample of substantially uniform attenuation coefficient at the image plane;
  (ii) operating the detector to measure a field of attenuation information for the calibration sample;
  (iii) producing a two-dimensional array of attenuation information for the sample wherein the two dimensions are the x and y coordinates of the image plane, and the information stored for each coordinate relates to any deviation between the measured attenuation coefficient and the uniform attenuation coefficient of the sample;
  (iv) performing the steps (ii) and (iii) for a plurality of calibration samples to produce a three-dimensional correction array in which the coordinates are the x and y coordinates of the image plane and the uniform attenuation coefficients of the calibration samples;

(e) positioning an object to be inspected in the image plane and exposing it to x-rays to collect a raw set of attenuation coefficients for the object;

(f) correcting the raw set of attenuation coefficients on a pixel-by-pixel basis by:
  (i) obtaining for each pixel a correction value by addressing the three-dimensional correction array at the x and y coordinates of the pixel and the attenuation coefficient coordinate of the raw coefficient to derive a correction factor; and
  (ii) applying the correction factor to the raw attenuation coefficient to produce and store a corrected attenuation coefficient.

5. The method as set forth in claim 4 wherein the step of addressing the three-dimensional correction array addresses the array at two planes defined by the uniform attenuation coefficients which bracket the measured attenuation coefficient for the pixel, and further performing the step of interpolating between the correction factors derived from the two planes.

6. The method as set forth in claim 5 wherein the three-dimensional array is configured to store samples for super pixels comprising a subarray of pixels from the image plane, the correction factor for the super pixel being applied to all of the image plane pixels comprising the super pixel.

7. The method as set forth in claim 4 wherein the x-ray source is maintained energized during the calibrating steps and subsequent inspection of objects.

8. The method as set forth in claim 4 in which the calibrating steps comprise performing the calibration with about 10 calibration samples which span a range of gray scales related to attenuation coefficients having a range of about 250 gray scale units.

9. The method as set forth in claim 4 in which the step of adjusting the relative positions of the x-ray source and sensor comprises aligning the source and sensor such that the center frequency of the x-ray source is coincident with the central region of peak illuminance of the detector.

10. The method as set forth in claim 9 in which each plane of the three-dimensional correction array has a center pixel associated with the central region of peak illuminance of the detector, the attenuation information stored in the three-dimensional array comprises deviations of the raw measurements from the uniform attenuation coefficients of the samples, and the center pixel of each plane is adjusted to have a zero deviation.

11. The method as set forth in claim 4 in which the step of adjusting the parameters of the x-ray source establishes levels of contrast discrimination, sensitivity and resolution required by the objects to be inspected.

12. A radiographic system for inspecting objects and for producing digital RTR images of said objects corrected for x-ray system inhomogeneities, the system comprising in combination:

an x-ray source for exposing an image plane and a quasi-planar x-ray detector for detecting x-rays from the source passing through the image plane, the source and detector having random inhomogeneities which produce attenuation errors in the x-ray intensity readings;

an image processor responsive to the x-ray detector for storing an RTR image of an object, the RTR image comprising digital representations of the x-ray attenuation of the object on a pixel-by-pixel basis;

a three-dimensional correction memory having x and y coordinates corresponding to the pixels of the image and an attenuation coordinate related to the different values of attenuation to be measured by the system;

the system having a calibration mode in which the three-dimensional correction memory is loaded with correction information generated from a plurality of sample attenuators of respective nominal attenuation values sequentially exposed during the calibration procedure, the correction memory containing locations for information relating to deviation between measured and nominal attenuation factors caused by x-ray system inhomogeneities;

the system having an inspection mode for making of a RTR image from a sample, the image processor in the inspection mode being adapted to obtain a set of raw measurements taken from the object, and for each pixel thereof being further adapted to access the three-dimensional correction memory at each set of pixel coordinates in conjunction with the attenuation coordinate corresponding to the raw measurement at said pixel to produce a correction factor and apply it to the raw measurement to produce and store a corrected attention measurement for each said pixel.

13. A system for x-ray inspection of objects for producing RTR images corrected for x-ray system inhomogeneities, the system comprising, in combination:

an x-ray source for exposing an image plane and a quasi-planar x-ray detector for detecting x-rays from the source passing through the image plane, the source and detector having random inhomogeneities which produce attenuation errors in the x-ray intensity readings;

an image memory for collecting and storing attenuation information from the detector for each pixel of the image plane relating to the x-ray intensity information passed through an unknown sample positioned in the image plane, the information relating to the intensity of the radiation measured at each x and y coordinate of an object in the image plane;

a three-dimensional correction memory storing correction information relating to the system inhomogeneities and indexed by the x and y coordinates of the image plane and intensity coordinates relating to a plurality of "standard" attenuation samples of respective varying density representative of samples to be imaged;

means for accessing the correction memory to derive a correction value for the pixels of the image memory, the means for accessing serving to access the correction memory at the x and y coordinates of the image pixel to be corrected and the intensity coordinate approximating the raw intensity information for that pixel; and means for applying the correction value derived from the correction memory to the raw measurement for the pixel in question to produce and store correct attenuation information for all image pixels.

14. The combination as set forth in claim 13 in which the means for accessing the correction memory accesses said memory at the x and y coordinates of the pixel to be corrected and two intensity coordinates bracketing the raw intensity information for the pixel being corrected, and means for linearly interpolating between the correction values read from the correction memory.

15. The combination as set forth in claim 13 in which the three-dimensional correction memory stores correction information for super pixels comprising a subarray of image plane pixels, the correction information stored for each super pixel being applicable to all of the subpixels of the image plane associated with said super pixel.

16. The combination as set forth in claim 13 in which the x-ray sensor is an image intensifier having a quasi-planar surface adapted to receive x-rays, and a CCD camera associated with the image intensifier for measuring the intensity information.

17. The combination as set forth in claim 13 in which the x-ray source and x-ray detector are associated with means for relative alignment thereof to cause the central frequency ray of the x-ray source to impinge upon approximately the center of the x-ray detector.

18. The combination as set forth in claim 17 in which the three-dimensional correction memory has a central pixel for each plane indexed by the central x and y coordinates, the three-dimensional correction memory storing deviation information between a measured attenuation value for a standard sample and the standard attenuation value associated with that sample, the central pixel of the three-dimensional array being adjusted to store zero deviation information.

* * * * *